July 4, 1967  R. R. TONELLI  3,329,440
SKI SLED AND BRAKING MEANS
Filed Dec. 30, 1964  2 Sheets-Sheet 1
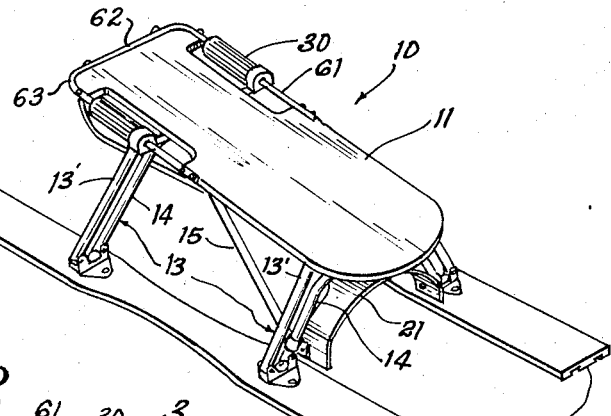
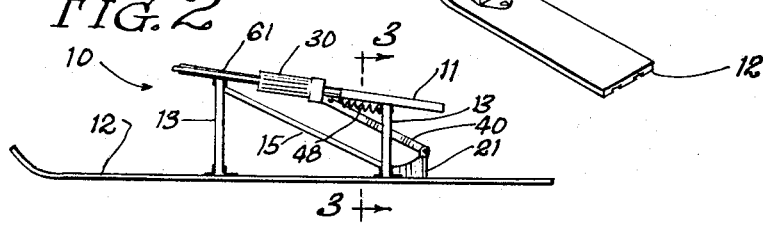
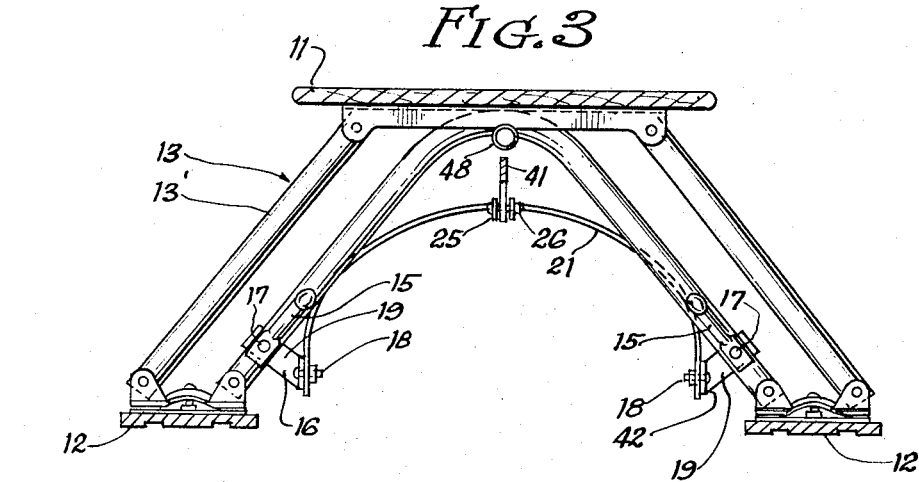
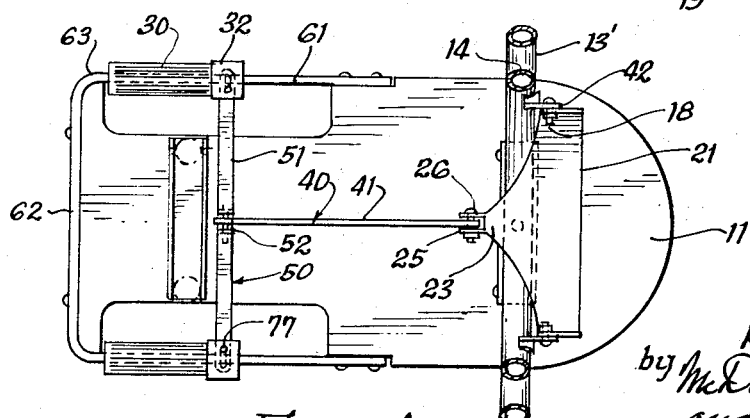
INVENTOR
Roger R. Tonelli
by McDougall, Hersh
and Scott
Attys July 4, 1967   R. R. TONELLI   3,329,440
SKI SLED AND BRAKING MEANS
Filed Dec. 30, 1964   2 Sheets-Sheet 2
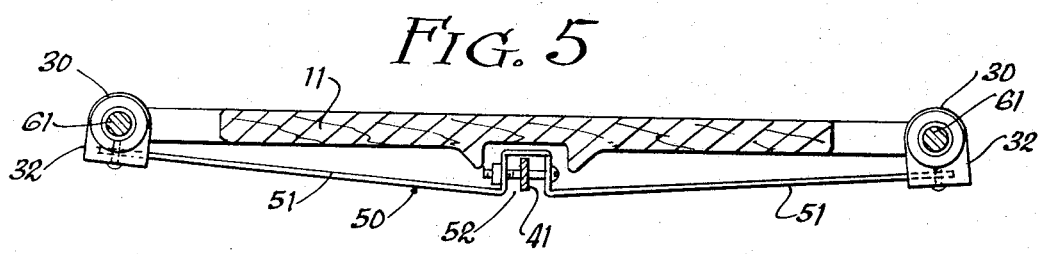
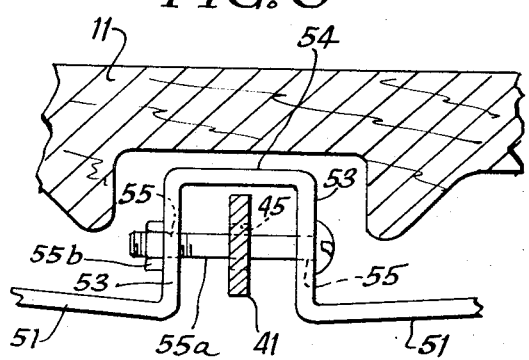
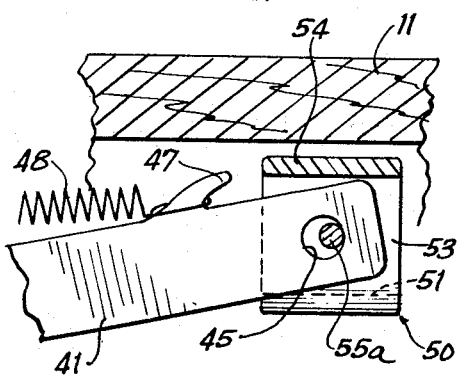
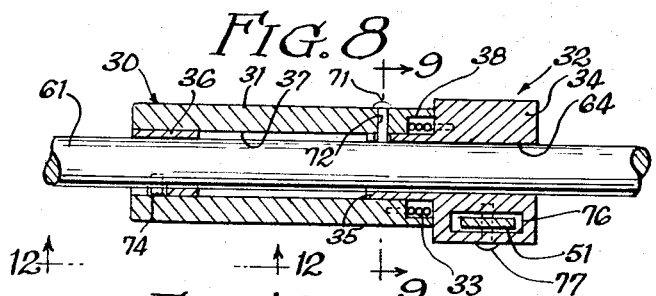
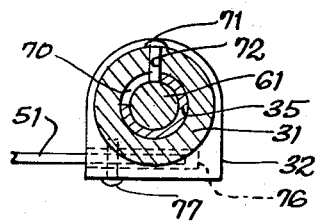
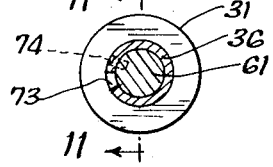
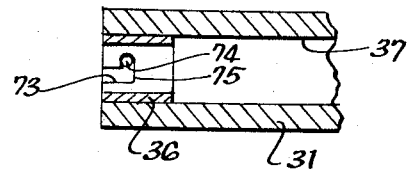
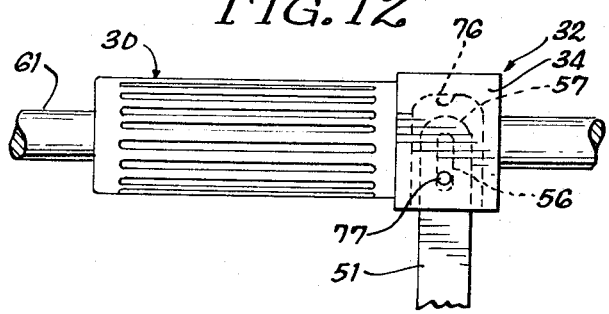
INVENTOR
Roger R. Tonelli
by McDougall, Hersh
and Scott
Att'ys

United States Patent Office 3,329,440
Patented July 4, 1967

3,329,440
SKI SLED AND BRAKING MEANS
Roger R. Tonelli, Chicago, Ill., assignor to Radio Steel & Mfg. Co., Chicago, Ill., a corporation of Illinois
Filed Dec. 30, 1964, Ser. No. 422,178
9 Claims. (Cl. 280—21)

This invention relates to a sled for coasting over the snow and more particularly to a ski sled which is capable of steering and slalom movements over the snow by tipping the skis about their longitudinal axes responsive to tilting action of the platform or seat upon which a person or persons rest. The invention relates more specifically to a sled of the type described with new and novel means for braking the sled to effect slowdown in its forward movements.

The invention will be described with reference to a ski sled of the type described in my copending application Serial No. 422,114, filed December 30, 1964, and entitled Ski Sled and Mounting Means, but it will be understood that the braking means, embodying the features of this invention, will have application to other sleds of more conventional construction.

In the aforementioned copending application, description is made of a ski sled having a pair of skis arranged in laterally spaced apart parallel relation with a platform or seat maintained in position between the skis and at a higher level by a group of rods wihch are pivotally connected to the seat or platform at their upper ends and to the upper surfaces of the skis at their lower ends, with the pivots spaced laterally whereby the skis automatically tilt in one direction or the other about their longitudinal axes responsive to tilting movement of the seat or platform. Thus merely by shifting the weight of the rider to rock the seat, the skis can be tilted in the same direction to enable steering movements of the sled or slalom movements over the snow as in conventional skiing.

Oftentimes, as in skiing or in sledding, it is desirable to retard the acceleration of the sled or to slow the sled in its downhill run. In skiing this can sometimes be effected by proper manipulation of the skis, but it is a dangerous operation. In sledding, this is sometimes sought to be accomplished by dragging one's feet over the snow, but often with little, if any, result. In a ski sled of the type described, it is essential to provide positive and effective means for braking and it is desirable to enable variations in the degree of braking for safe operation of the sled over different slopes and over terrain where obstacles may exist. It is also desirable to embody means for enabling the brakes to be set substantially automatically in the event of loss of grip or control for otherwise the sled may run wild and expose the rider and others to various dangers.

It is an object of this invention to provide an efficient speed brake for coaster sleds which is safe, easy and simple in operation; which is sturdy in construction; which can be economically manufactured of readily available materials; which is capable of variation in its braking action to control the amount of retardation or deceleration; which is positive in its action to provide the desired degree of braking action; which can be made to become effective substantially automatically to achieve slowdown in the speed of the sled or its rate of acceleration, and which may easily be used by young and old alike.

More specifically, it is an object of this invention to provide a sled with a manually operable scoop which may be adjusted to dig into the snow to create an effective resistance to effect slowdown of the sled or deceleration in its speed.

It is an additional object of this invention to provide a spring actuated braking mechanism of the type described which is capable of stopping the sled in the event that the operator falls from the sled or otherwise loses control.

These and other objects and advantages of this invention will hereinafter appear and for purposes of illustration, but not of limitation, an embodiment of the invention is shown in the accompanying drawings, in which—

FIG. 1 is a perspective elevational view of a ski sled embodying the braking device of this invention showing the braking mechanism in inoperative position;

FIG. 2 is a side elevational view of the ski sled shown in FIG. 1;

FIG. 3 is a sectional view taken along the line 3—3 of FIG. 2;

FIG. 4 is a sectional view taken along the line 4—4 of FIG. 3 with portions omitted for better illustration of the supporting structure and brake mechanism;

FIG. 5 is a sectional view taken along the line 5—5 of FIG. 4;

FIG. 6 is a sectional view taken along the line 6—6 of FIG. 4;

FIG. 7 is a sectional view taken along the line 7—7 of FIG. 6;

FIG. 8 is a cross-sectional view of the brake handle on the handle support;

FIG. 9 is a sectional view taken along the line 9—9 of FIG. 8;

FIG. 10 is a sectional view showing the locking end of the control therein;

FIG. 11 is a sectional view taken along the line 11—11 of FIG. 10; and

FIG. 12 is a sectional view taken along the line 12—12 of FIG. 8.

Referring first to FIG. 1 for a general description, the ski sled 10 comprises a platform 11 supported above and disposed centrally between a pair of spaced apart parallel skis 12 by a supporting structure 13 composed of a plurality of rod members.

In the illustrated modification, use is made of two groups of rod members, one of which operates to support the forward end of the platform 11 while the other group supports the rearward end portion of the platform. As previously described, the rods operate to translate tilting movement of the platform to corresponding tilting movement of the skis for a thrilling ride which permits all of the slalom or other movements available in normal skiing. For this purpose, each group of rods includes inner rods 14 pivotally connected at their upper end to a midsection of the platform with the lower end of one rod pivotally connected to one ski while the lower end of the other rod is pivotally connected to the other ski. Each group also includes outer rods 13' spaced outwardly from the inner rods 14 and in substantially parallel relationship therewith. The upper ends of the outer rods 13 are pivoted to the underside of the platform while the lower ends are pivoted to the upper portion of the skis but with the pivots laterally spaced from the pivots of the inner rods 14 whereby the pair of rods 13' and 14 form a substantial parallelogram by their pivots to impart the described translation.

An important feature of this invention resides in the braking mechanism which comprises a scoop-shaped blade 21 positioned between the skis and pivotally mounted from its lateral edges onto brackets 16 secured to the inner rods 14 for rocking movement of the scoop between raised or inoperative position, shown in FIGS. 1 and 3, and lowered or operative position, shown in FIG. 2. The scoop blade 21 is illustrated as a metal plate formed to curvilinear shape but it will be understood that the scoop blade can be formed to other shapes such as a straight crosswise extending plate with lateral end portions extending forwardly substantially perpendicularly to provide a rectangularly shaped scoop or the scoop can be formed to other polygonal shapes. The lateral ends of the scoop are turned to extend substantially parallel for mounting onto correspondingly disposed flanges 42 on the bracket 16 which has a body portion 19 formed with an opening at one end for receiving fasteners 17 which secure the bracket to the rod 14. The flanged portions are provided with openings which register with openings in the parallel portions of the scoop for interconnection by bolt and nut means 18 pivotally to mount the scoop between the skis for rocking movement about the crosswise horizontal axis between raised and lowered positions.

The scoop is adapted to be rocked about its pivot between raised and lowered positions by a linking mechanism 40 which interconnects controls 30 with the scoop. The linking mechanism, shown in FIG. 4, comprises an elongate bar 41 pivotally connected at its rearward end portion to the scoop and at its forward end portion to a cross arm 50 which in turn is pivoted at its outer ends onto the handles 30. As illustrated in FIGS. 3 and 4, the pivotal connection between the rearward end portion and the scoop is effected by means of a pivot pin 26 which extends crosswise through an opening in the end portion of the bar 41 in registry with openings in a pair of laterally spaced apart flanged portions 25 which extend upwardly integrally from an upper edge of a central portion of the scoop and between which the bar 41 is received. The pivot pin is illustrated as a bolt which extends through the registered openings for receiving a nut member on the end thereof pivotally to interconnect the bar 41 with the scoop 21 with the pivotal connection offset from the pivot support for the scoop 21 to enable rocking movement of the scoop between raised and lowered positions responsive to longitudinal displacement of the elongate linking bar 41.

The pivotal connection between the forward end portion of the bar 41 and the cross arm 50 is effected as illustrated in FIGS. 5, 6 and 7 by offsetting the midportion of the cross arm to provide a U-shaped section having a bail portion 54 and parallel arms 53 with the arms being provided with crosswise aligned openings 55 for the insertion of the shank of a bolt member 55a therethrough and which is secured in position of use by a nut member 55b. The forward end portion of the bar 41 is dimensioned to have a width considerably less than the spaced relationship between the arms 53 of the U-shaped section and also to be of lesser depth. The end portion of the bar 41 is provided with a crosswise opening which may be brought into registry with the openings 55 in the arms 53 to enable the shank of the bolt to be inserted therethrough pivotally to connect the forward end portion of the bar 41 onto the cross arm 50 in a manner not only to permit relative rocking movement of the bar in a vertical plane but also to enable the bar to be displaced laterally between the walls or to be rocked also in a crosswise direction, for a purpose which will hereinafter be described. For this purpose, it is desirable to form the opening 45 through the bar to a larger dimension than that of the shank of the bolt.

The laterally extending arms 51 of the cross arm 50 each terminate in a longitudinal slot 56 adjacent its end 57 for pivotally securing it to a control handle, as shown in FIG. 12.

Control handles 30 are slidably supported on a control handle support, said support including two portions 61 rigidly secured to the sled platform parallel to the center line of the sled, and a straight portion 62, perpendicular to, coplanar with, and disposed between the two parallel portions 61. The straight part 62 is connected at each end to the adjacent parallel portion 61 by curved portions 63. The entire support member is preferably formed from a single piece of stock having a circular cross-section.

Means are provided constantly to urge the cross arm 50 to retracted position thereby concurrently also to urge the link toward retracted position for rocking movement of the scoop to lowered position. For this purpose use is made of a tension spring 48 connected at the forward end to a hook 47 on the bar 41 and at the rearward end the spring is fixed onto a rearward end portion of the framework of the sled such as to the upper end portion of the inner rod 14 of a bracket fixed to the underside of the platform.

FIG. 8 shows a control handle 30 as comprising a hollow cylindrical grip member 31, a mating member 32 and a torsionally resilient member 33 disposed between. Mating member 32 defines a body portion 34 and a cylindrical neck portion 35, a cylindrical passage 64 defined throughout dimensioned to comfortably slidably receive straight portion 61 of the control handle support.

Grip member 31 comprises a cylindrical body having at its forward end a locking collar 36 defining therethrough a cylindrical opening dimensioned to comfortably slidably receive portion 61 of the control handle support, a central cylindrical hollow portion 37 dimensioned of greater diameter than the opening through the collar to comfortably slidably receive therein at its rearward end cylindrical neck portion 35 of the mating member, and a cylindrical access 38 in the rearward end of the body dimensioned of a depth substantially less than the depth of the neck 35 and of a diameter substantially greater than the diameter of the neck as to provide an enclosed hollow space between the outer face of the neck 35 adjacent the body portion of the mating member and the body of grip member 31 of volumetric capacity adequate for enclosure of resilient member 33 comprising a coil spring secured for torsional response at one end of the grip member 31 and at the other end to the mating member 32.

As appears in FIG. 9, the neck 35 of the mating member defines substantially close to its outer end a circumferential slot 70 of less than 90° adapted to receive pin 71 inserted through hole 72 in the body of grip member 31 thereby to restrict rotational movement of said grip 31 as well as to secure the grip to the mating member eliminating relative axial movement of the two members.

At the forward end of the grip member the locking collar defines a slot 73 extending inward from its outer end and having an offset cutout portion 75 at its inner end, said slot adapted to receive stud 74 which is securably seated in straight portion 61 of the handle support at the desired position of maximum forward movement of the control handles.

Resilient member 33 comprising a coil spring is securably fastened to both the mating member 32 and the grip member 31 and in normal position is in a condition of torsional tension whereby the stud 74 is held engagingly seated in the cutout 75 in lock position at the inner end of the slot 73 in the locking collar. Rotation of the grip may be effected to disengage the stud thereby putting the stud in unlocking position permitting the grip member to axially move rearward along support portion 61 away from the stud, said rotation being limited by the end of the slot 70 contacting the pin 71 inserted therein and acting to increase the torsional tension on the spring 33 so that unless the grip member is moved rearward as to withdraw the stud from the slot 23, the stud will again be engagingly seated in locking position in the cutout 75, when the grip member rotates back to locking position.

It is intended that the direction of rotation necessary to move the control handles from locked to unlocked position is clockwise for the right handle and counterclockwise for the left. Similarly, spring 33 in the right handle will urge it into counterclockwise rotation into locking position, and in the left handle, rotation will be urged in the clockwise direction.

The body portion of the mating member defines, as shown in FIGS. 8 and 12, an essentially rectangular hollow portion 76 having a base, a top and three sides disposed below the cylindrical passage 64, the fourth side open for receiving the end 57 of cross member 51 and having included therein a pivot pin 77 dimensioned to extend through the hollow from base to top and passing through the slot 56 in the end of cross member 51 pivotally connecting the control handle to the cross member.

In the operation of the braking device of this invention, rotation of the handles from locking to unlocking position frees them for rearward sliding movement along straight portions 61 of the control handle support. Urged by the operator as well as the tension in the spring 48, the rearward movement of the control handles 30, the cross member 51, and linking member 41, will cause scoop 21 through force exerted on pivot pin 26 at the extremity of the hinging portion 23 to rotate about pivots 18 into engaging relationship with the snow between the snow skis. The degree of braking achieved will, of course, be determined by the degree of engagement. Maximum engagement and therefore maximum braking is achieved when both control handles are displaced to their rearmost position.

It will be appreciated that although one control handle may remain locked, braking may still be accomplished by movement of the other. With one handle locked, rearward movement of the other causes the cross member 51 to pivot at each end about pivot pins 77, said pin also moving in relation to the cross member relatively outward in the slots 56. Moreover, it will be appreciated that cross member 51 will pivot laterally through its center pivot 52 about the hole 45 in the end of the linking member 41, thus explaining the desirability of having hole 45 of greater diameter than pin 46.

Rearward movement of one handle only will result in a partial braking effect as the braking scoop will rotate only about pivots 18 through substantially one-half of the arc it would otherwise describe if both handles were moved rearward. Use of one handle rather than both is advantageous when braking is used to augment steering control, the operator desiring only brief moments of slight braking rather than rapid deceleration.

It will be appreciated that the clockwise rotation of the right handle and the counterclockwise rotation of the left handle from locking to unlocking positions act as a safety measure, for should the operator fall off the sled from the right side while the hold he has on the right control handle will cause it to rotate clockwise, thus unlocking it and similarly of all from the left side will impart to the left handle a counterclockwise rotation, unlocking it. Once a handle is unlocked the tension in the spring 48 will urge the scoop into engaging relationship with the snow, thereby braking the forward momentum of the sled bringing it to a stop so that it can be recovered by the operator.

It is intended that the braking device of this invention be constructed from light, strong, inexpensive, corrosion-resistant materials such as plastic, steel and aluminum.

It will be understood that changes may be made in the details of construction, arrangement, operation, and materials from which the braking device can be formed without departing from the spirit of the invention, especially as defined in the following claims.

I claim:

1. In a snow sled comprising a pair of runners in laterally spaced apart parallel relation, a platform, and rod means for supporting the platform above and between the runners, the improvement comprising means for braking the speed of the sled over the snow comprising a scoop, means mounting the scoop to extend crosswise of the sled for rocking movement between raised position, out of contact with the snow, and lowered position to a level below the runners, and control means for said scoop, said control means comprising handle means, and elongated supporting structure for said handle means, said handle means being reciprocally movable on said supporting structure, and link means interconnecting said handle means and said scoop, said link means operating to move said scoop between said raised and lowered positions as said handle means is moved between first and second positions on said supporting structure, said scoop being a relatively rigid plate of curvilinear contour in the crosswise direction to provide concavity facing in the forward direction without curvature about the horizontal axis.

2. A snow sled as claimed in claim 1 which includes means constantly urging the scoop towards lowered position into contact with the snow.

3. In a snow sled comprising a pair of runners in laterally spaced apart parallel relation, a platform, and rod means for supporting the platform above and between the runners, the improvement comprising means for braking the speed of the sled over the snow comprising a scoop, means mounting the scoop to extend crosswise of the sled for rocking movement between raised position, out of contact with the snow, and lowered position to a level below the runners, control handles slideable lengthwise on the platform, and a linking means pivotally connecting the handles with the scoop to effect rocking movement of the scoop between raised and lowered positions responsive to lengthwise displacement of the handles, said linking means comprising a cross arm extending crosswise of the sled and pivoted at its outer ends to the handles, and a longitudinally extending link pivotally connected at one end portion to the cross arm and at the other end portion to the scoop whereby longitudinal displacement of a handle will effect longitudinal displacement of the link to effect rocking movement of the scoop about its pivot.

4. A snow sled as claimed in claim 3 which includes means constantly urging the scoop towards lowered position including a spring means, means anchoring the spring at one end onto the link and at the other end onto a rearward portion of the sled constantly to urge the scoop towards lowered position.

5. In a snow sled constructed in accordance with claim 3 in which the control handles are slidably mounted on a support structure, said structure comprising a rigid tubular member having coplanar portions consisting of a central straight portion, straight end portions, and curved portions interconnecting the straight end portions with the central portion, means rigidly fastening the straight central portion to the front of the platform in a position disposed laterally to the center line of the sled, means rigidly fastening the straight end portion in position rearwardly extending from the front of the platform substantially parallel to the center line of the sled, each end portion adapted to slidably support the control handles.

6. A snow sled constructed in accordance with claim 3 in which the cross member comprises a central portion adapted to receive means for pivotally connecting the cross member with linking means disposed between the cross member and the scoop, defining a base portion and two side portions, a hole in each side portion aligned with the opposing hole, outward extending arms from the ends of the side portions opposite the base dimensioned to reach the control handles, and longitudinal slots substantially close to the outer ends of the arms adapted to receive means for pivotally connecting said ends to the control handles.

7. A snow sled including in combination a pair of runners in spaced apart parallel relation; a platform centrally disposed with reference to the runners; means attached to said runners and platform to support the platform above the runners; a brake mechanism comprising a scoop, means pivotally mounting the scoop between the platform supports, control means and a linking means operative connecting the control means with the scoop to effect pivoting movement of the scoop between snow engaging position and snow disengaging position consisting of a cross member pivotally interconnecting the control means, means for pivotally connecting the cross member at its center to one end of a straight linking member, additional means for pivotally connecting the other end of said straight linking member to the scoop, means urging the scoop into snow engaging relationship, and latching means for releasably restraining the scoop from pivoting movement into snow engaging position, and wherein the control means includes handles slideably mounted on tubular control handle supports, each handle comprising a cylindrical rotatable grip member; a non-rotatable member adapted to receive means for pivotally connecting the control handles to the ends of the cross member; means for holding the rotatable and non-rotatable members in contacting relationship; means limiting the rotation of the rotating member with respect to the non-rotating member; torsionally resilient means normally urging the rotating member into a position at one limit of rotation with respect to the non-rotating member; and latching means whereby rotation of the rotating member from the normal position to which it is urged to the other limit of rotation of the rotating member urges the handle from latched to unlatched position.

8. A snow sled including in combination a pair of runners in spaced apart parallel relation; a platform centrally disposed with reference to the runners; means attached to said runners and platform to support the platform above the runners; a brake mechanism comprising a scoop, means pivotally mounting the scoop between the platform supports, control means and a linking means operative connecting the control means with the scoop to effect pivoting movement of the scoop between snow engaging position and snow disengaging position consisting of a cross member pivotally interconnecting the control means, means for pivotally connecting the cross member at its center to one end of a straight linking member, additional means for pivotally connecting the other end of said straight linking member to the scoop, means urging the scoop into snow engaging relationship, and latching means for releasably restraining the scoop from pivoting movement into snow engaging position, said control means including two independently movable control handles whereby releasing one handle urges the scoop into partial snow-engaging relationship.

9. A snow sled constructed in accordance with claim 8 wherein releasing both control handles urges the scoop into maximum snow engaging relationship.

References Cited
UNITED STATES PATENTS

| | | | |
|---|---|---|---|
| 1,568,493 | 1/1926 | Allen | 280—12 |
| 3,190,671 | 6/1965 | Fabris | 280—28 X |
| 3,202,437 | 8/1965 | Masbruch | 188—8 X |

BENJAMIN HERSH, *Primary Examiner.*

MILTON BUCHLER, *Examiner.*

M. S. SALES, L. D. MORRIS, *Assistant Examiners.*